United States Patent
Takahata et al.

(10) Patent No.: US 6,759,777 B2
(45) Date of Patent: Jul. 6, 2004

(54) PERMANENT MAGNET TYPE ELECTRIC ROTATING MACHINE

(75) Inventors: Ryoichi Takahata, Hitachi (JP); Shinichi Wakui, Hitachi (JP); Haruo Koharagi, Juo (JP); Satoshi Kikuchi, Hitachi (JP); Miyoshi Takahashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/207,264

(22) Filed: Jul. 30, 2002

(65) Prior Publication Data

US 2003/0067236 A1 Apr. 10, 2003

Related U.S. Application Data

(62) Division of application No. 10/101,441, filed on Mar. 20, 2002.

(30) Foreign Application Priority Data

Oct. 5, 2001 (JP) ........................................ 2001-309344

(51) Int. Cl.[7] .............................................. H02K 21/14
(52) U.S. Cl. .......................... 310/156.38; 310/156.46; 310/156.56; 310/216; 310/261
(58) Field of Search ........................ 310/156.36, 156.37, 310/156.38, 156.46, 156.53, 156.56, 216, 261

(56) References Cited

U.S. PATENT DOCUMENTS

| | | | |
|---|---|---|---|
| 5,162,686 A | * | 11/1992 | Royer ..................... 310/156.59 |
| 5,220,228 A | * | 6/1993 | Sibata ......................... 310/254 |
| 5,670,836 A | * | 9/1997 | Horst ..................... 310/156.15 |
| 5,864,191 A | * | 1/1999 | Nagate et al. .......... 310/156.54 |
| 6,082,132 A | * | 7/2000 | Numoto et al. ................ 62/498 |
| 6,147,428 A | * | 11/2000 | Takezawa et al. ...... 310/156.57 |
| 6,313,557 B1 | * | 11/2001 | De Filippis et al. ......... 310/216 |
| 2002/0067096 A1 | * | 6/2002 | Yamamoto et al. .......... 310/216 |

FOREIGN PATENT DOCUMENTS

| | | |
|---|---|---|
| JP | 02-211031 | 8/1990 |
| JP | 3-106869 | 11/1991 |
| JP | 2001-086672 | 3/2001 |

* cited by examiner

*Primary Examiner*—Thanh Lam
*Assistant Examiner*—David W. Scheuermann
(74) *Attorney, Agent, or Firm*—Crowell & Moring LLP

(57) ABSTRACT

A permanent magnetic type electric rotating machine includes: a stator having armature winding arranged in several slots formed in a stator core; and a rotor having permanent magnets held in several permanent magnetic insertion holes formed in a rotor core, in which a peripheral surface of the rotor core is configured to be a combination of arcs around two points different from a center of the rotor core for each magnetic pole in such a manner that when an axis extending in a central direction of a magnetic pole of the rotor is a d axis, and an axis extending in a direction between magnetic poles that is offset from the central direction of the magnetic pole by 90 electrical degrees is a q axis, a radial distance from a center of the rotor core to a periphery of the rotor is reduced gradually from the d axis to the q axis.

32 Claims, 9 Drawing Sheets

PERMANENT MAGNET TYPE ELECTRIC ROTATING MACHINE

This application is a division of application Ser. No. 10/101,441, filed Mar. 20, 2002.

FIELD OF THE INVENTION

The present invention relates to a permanent magnetic type electric rotating machine having a permanent magnet for a field in a rotor, and more particularly to a permanent magnetic type electric rotating machine suitable for use in a compressor of an air conditioner, a refrigerator, or a freezer.

BACKGROUND OF THE INVENTION

In permanent magnetic type electric rotating machines of this kind, various attempts have been made to reduce noise and vibration, that is, to reduce torque pulses. For example, as described in JP-U-3-106869 specification, centers of tips of stator teeth form a circle concentric with a rotor core, and both ends of the tips of the teeth are formed in a straight line, that is, placed apart from a rotor to thereby reduce torque pulses.

When a harmonic current passes through armature winding of the permanent magnetic type electric rotating machine, a harmonic magnetic flux is generated to increase the torque pulses, so that reducing the harmonic current is important for reducing noise and vibration. A waveform of an armature current depends on a waveform of a voltage applied on the armature winding and a waveform of a back electromotive force (induced electromotive force), and thus the waveform of the induced electromotive force may be brought close to a sine wave.

In the above described conventional technique, both ends of the tips of the teeth are placed apart from the rotor to smooth magnetic flux distribution in the machine (or to bring the waveform of the induced electromotive force close to the sine wave) and to thereby reduce the torque pulses. However, the farther from the rotor the both ends of the tips of the teeth are placed, the smaller sectional areas of slots become, thereby preventing insertion of the armature winding. Thus, there is a limitation in reducing the torque pulses by a tip shape of the teeth.

SUMMARY OF THE INVENTION

An object of the present invention is to provide a permanent magnetic type electric rotating machine sufficiently reducing torque pulses and causing low vibration and low noise.

In order to attain the above described object, the present invention proposes a permanent magnetic type electric rotating machine including: a stator having armature winding arranged in a plurality of slots formed in a stator core; and a rotor having permanent magnets held in a plurality of permanent magnetic insertion holes formed in a rotor core, wherein a peripheral surface of the rotor core is configured in such a manner that when an axis extending in a central direction of a magnetic pole of the rotor is d axis, and an axis extending in a direction between magnetic poles that is offset from the central direction of the magnetic pole by 90 electrical degrees is q axis, and a radial distance from a center of the rotor core to a periphery of the rotor is reduced gradually from the d axis to the q axis.

The present invention further proposes a permanent magnetic type electric rotating machine including: a stator having concentrated armature winding arranged to surround teeth in a plurality of slots formed in a stator core; and a rotor having permanent magnets held in a plurality of permanent magnetic insertion holes formed in a rotor core, wherein a peripheral surface of the rotor core is configured in such a manner that when an axis extending in a central direction of a magnetic pole of the rotor is d axis, and an axis extending in a direction between magnetic poles that is offset from the central direction of the magnetic pole by 90 electrical degrees is q axis, and a radial distance from a center of the rotor core to a periphery of the rotor is reduced gradually from the d axis to the q axis.

As described above, in order to reduce vibration and noise of the permanent magnetic type electric rotating machine, it is necessary to suppress harmonic magnetic fluxes generated by a harmonic component of an armature current and to thereby reduce torque pulses. The harmonic component of the armature current depends on a waveform of a voltage supplied to a terminal of the permanent magnetic type electric rotating machine and a waveform of an induced electromotive force, and thus it is important to bring the waveform of the induced electromotive force close to a sine wave.

The present invention allows the waveform of the induced electromotive force of the permanent magnetic type electric rotating machine to be brought close to the sine wave by a peripheral shape of the rotor core. Therefore, the harmonic component of the armature current are reduced to thereby significantly reduce the torque pulses, thus providing a permanent magnetic type electric rotating machine causing low vibration and low noise.

Other objects, features and advantages of the invention will become apparent from the following description of the embodiments of the invention taken in conjunction with the accompanying drawings.

DETAILED DESCRIPTION OF THE INVENTION

Now, an embodiment of the present invention will be described in detail with reference to the drawings.

Embodiment 1

Figure 1:
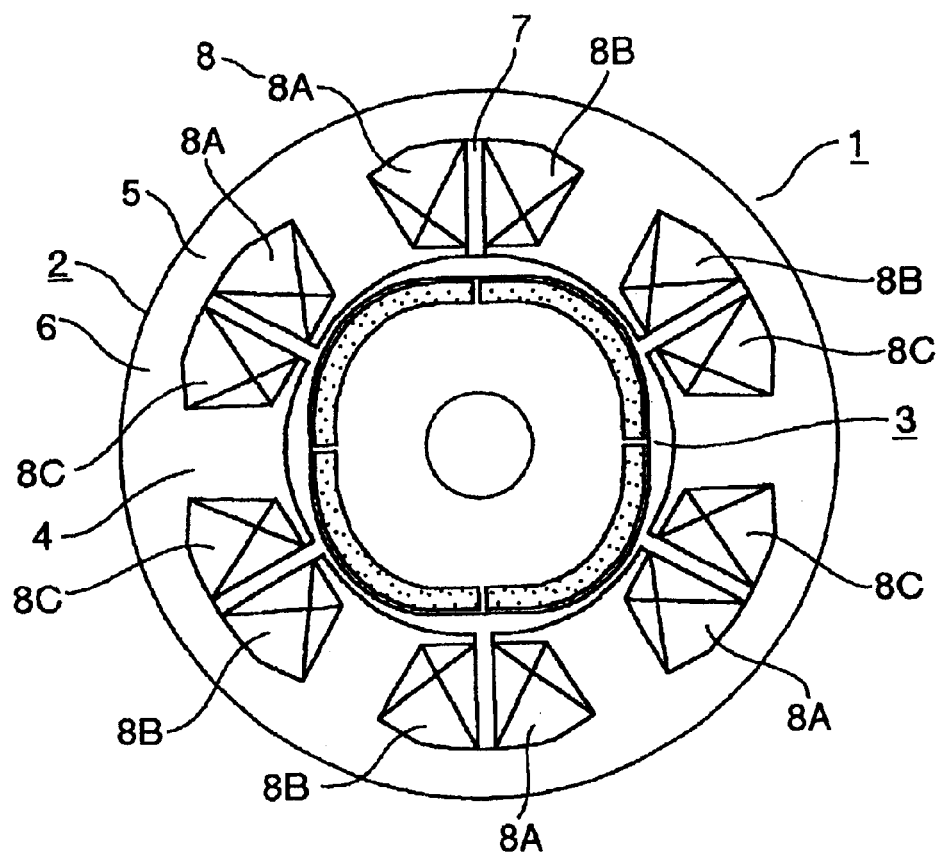
FIG. 1 is a sectional view of Embodiment 1 of a permanent magnetic type electric rotating machine according to the present invention.
Figure 2:
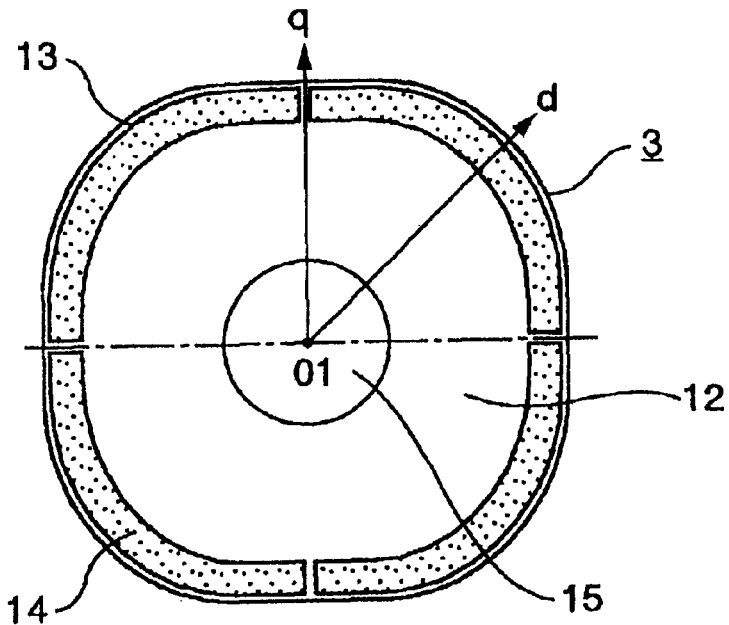
FIG. 2 is a sectional view of a rotor core in FIG. 1.
Figure 3:
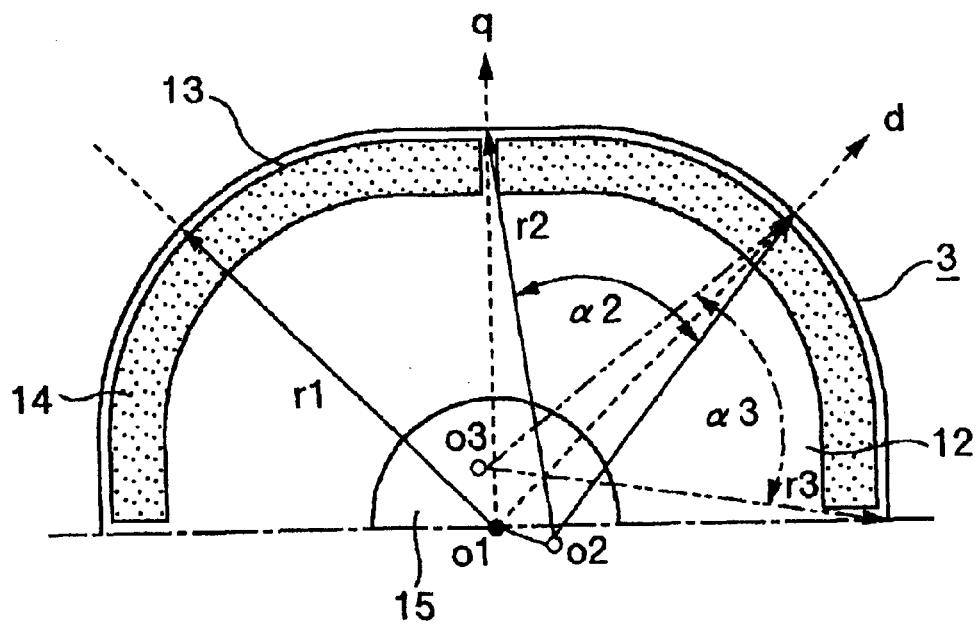
FIG. 3 is a sectional view of a peripheral shape of the rotor core in FIG. 1.
Figure 4:
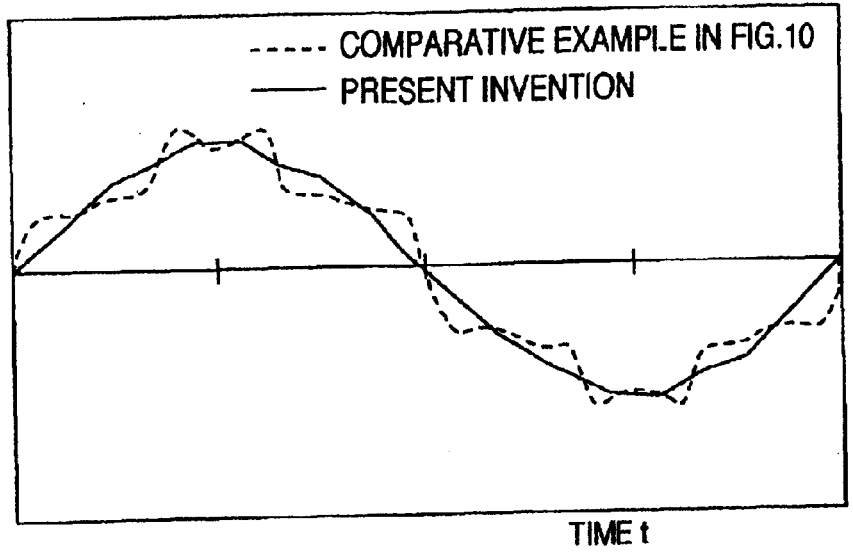
FIG. 4 shows a waveform of an induced electromotive force of the permanent magnetic type electric rotating machine according to the present invention.
Figure 10:
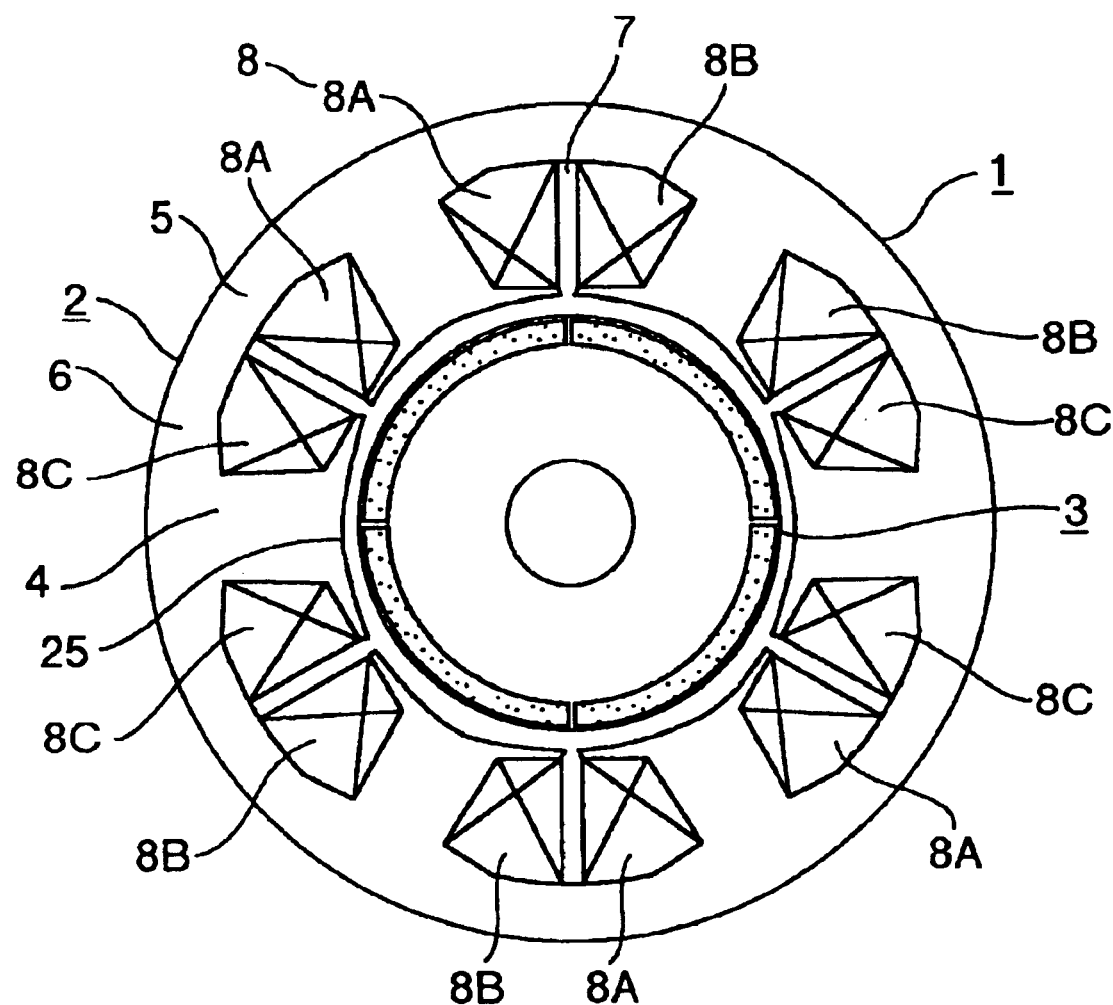
FIG. 10 is a sectional view of a permanent magnetic type electric rotating machine according to conventional technique.

FIG. 1 shows a shape of a radial section of Embodiment 1 of a permanent magnetic type electric rotating machine according to the present invention, FIG. 2 shows a shape of a radial section of a rotor of Embodiment 1 according to the present invention, FIG. 3 is a sectional view of a peripheral shape of the rotor of Embodiment 1 according to the present invention, FIG. 4 shows a waveform of an induced electromotive force of the permanent magnetic type electric rotating machine according to the present invention, and FIG. 10 is a sectional view of a structure of a comparative example of a permanent magnetic type electric rotating machine.

A permanent magnetic type electric rotating machine 1 comprises a stator 2 and a rotor 3. The stator 2 comprises a stator core 6 including teeth 4 and a core back 5, and concentrated armature winding 8 (three phase winding including U phase winding 8A, V phase winding 8B, and W phase winding 8C) arranged to surround the teeth 4 in slots 7 between the teeth 4. The rotor 3 has permanent magnets 14 (four poles are shown) held in permanent magnet inserting holes 13 formed in a rotor core 12, and comprises a shaft hole 15 for coupling to a shaft (not shown).

A permanent magnetic type electric rotating machine 1 for a compressor to be covered by the present invention often causes problems of vibration and noise. Specifically, concentrated armature winding 8 is winding of 120 degree (conventional distributed armature winding is winding of 180 degree, and has a low harmonic magnetic flux), and thus has a high harmonic magnetic flux to produce large torque pulses that cause vibration and noise.

Thus, as shown in FIG. 10, in the comparative example, centers of tips of stator teeth 25 form a circle concentric with a rotor core 12, and both ends of the tips of teeth 25 are formed in a straight line, that is, placed apart from a rotor 3. Such a structure reduces a harmonic component of an induced electromotive force and thus a harmonic current, thereby reducing a harmonic magnetic flux and thus torque pulses. However, the farther from the rotor the both ends of the tips of teeth 25 are placed, the smaller sectional areas of slots 7 become, thus causing problems that a diameter of a strand of the armature winding 8 must be reduced or the number of turns of the armature winding 8 must be reduced. Therefore, both ends of the tips of teeth 25 cannot be placed apart from the rotor 3 before vibration and noise are sufficiently reduced.

Thus, in the present invention, as shown in FIG. 3, a peripheral shape of the rotor core 12 is a combination of arcs around points O2, O3 different from a center O1 of the rotor core 12. Specifically, an axis extending in a central direction of a magnetic pole of the rotor 3 is d axis, an axis extending in a direction between magnetic poles that is offset from the central direction of the magnetic pole by 90 electrical degrees is q axis, a distances from the center O1 of the rotor core 12 to a periphery of the rotor core is r1, two points different from the center O1 are determined as O2, O3, and thus the peripheral shape of the rotor core 12 becomes the combination of the arcs around the points O2, O3. The points O2, O3 are symmetric with respect to the d axis, and have substantially equal distances r2, r3 from the points O2, O3 to the periphery of the rotor, and substantially equal angles of circumference α2, α3 of the arcs around the points O2, O3. Therefore, a radial distance from the center O1 to a periphery of the rotor is reduced gradually from the d axis to the q axis.

FIG. 4 shows a waveform of an induced electromotive force when the rotor is formed as shown in FIG. 3, as compared with a result when the peripheral shape of the rotor core 12 is a circle around the center O1 (concentric circle). When the peripheral shape of the rotor core 12 is the concentric circle around the center O1, the waveform of the induced electromotive force is significantly distorted, and a waveform distortion factor is about 19.3%. On the other hand, in this invention, a waveform distortion factor is about 2.7% and is relatively close to a sine wave.

Therefore, the present invention allows the waveform of the induced electromotive force to be brought close to the sine wave, and allows reduction of the harmonic current passing through the armature winding 8 and thus reduction of the harmonic magnetic flux, thereby reducing the torque pulses and thus vibration and noise.

The permanent magnet 14 is formed to protrude toward the periphery of the rotor, but the permanent magnet 14 may be formed into other shapes as long as a peripheral shape of a rotor core 12 is a combination of arcs around two points different from a center of the rotor core 12, and a radial distance from the center of the rotor core 12 to the periphery of the rotor core 12 is reduced gradually from a d axis to a q axis.

Embodiment 2

Figure 5:
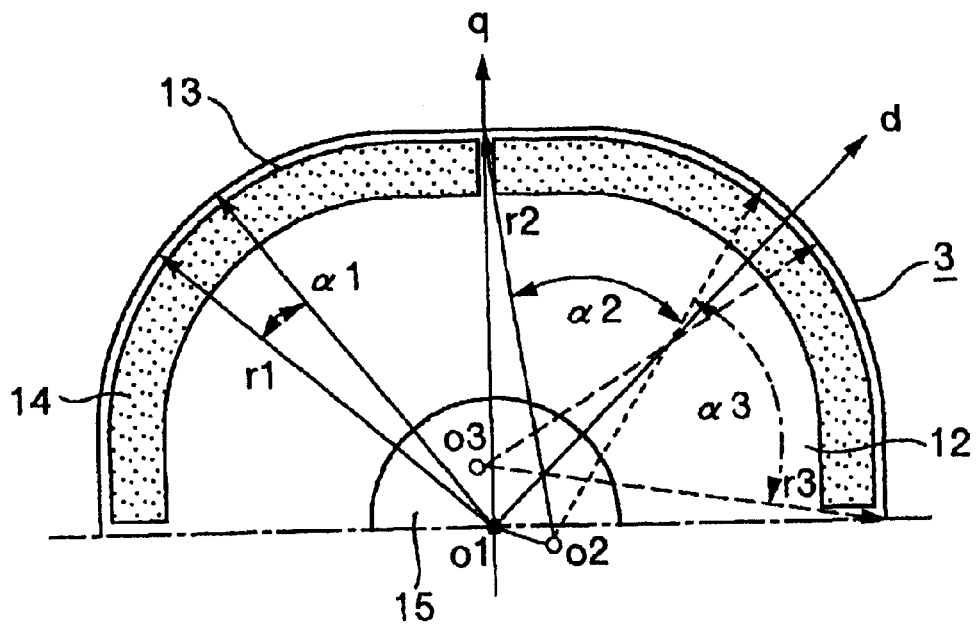
FIG. 5 is a sectional view of a peripheral shape of a rotor core of Embodiment 2 of a permanent magnetic type electric rotating machine according to the present invention.

FIG. 5 is a sectional view of a peripheral shape of a rotor of Embodiment 2 of a permanent magnetic type electric rotating machine according to the present invention.

For the rotor in the drawing, like reference numerals refer to like parts as shown in FIG. 3, and thus descriptions thereof will be omitted. FIG. 5 is different from FIG. 3 in that a peripheral shape of a rotor core 12 is a combination of an arc concentric with a center O1 of a rotor 3 and an arc not concentric therewith. Specifically, a shape of the rotor is a combination of arcs around points O2, O3 different from the center O1 and an arc around the center O1. For a peripheral shape of the rotor for each magnetic pole to be symmetric with respect to a d axis, a radius r2 of an arc around the point O2 and a radius r3 of an arc around the point O3 are equal, and an angle of circumference α2 of the arc around the point O2 and an angle of circumference α3 of the arc around the point O3 are equal.

In such a structure, the peripheral shape of the rotor 3 includes the arc around the center O1, so that inserting a cylindrical part between a stator 2 and the rotor 3 facilitates alignment of the stator 2 and rotor 3 (a uniform air gap can be obtained between the stator 2 and rotor 3).

It is understood that similar advantages to those of the embodiment shown in FIG. 3 can be obtained unless the angle of circumference α1 of the arc around the center O1 is increased.

Embodiment 3

Figure 6:
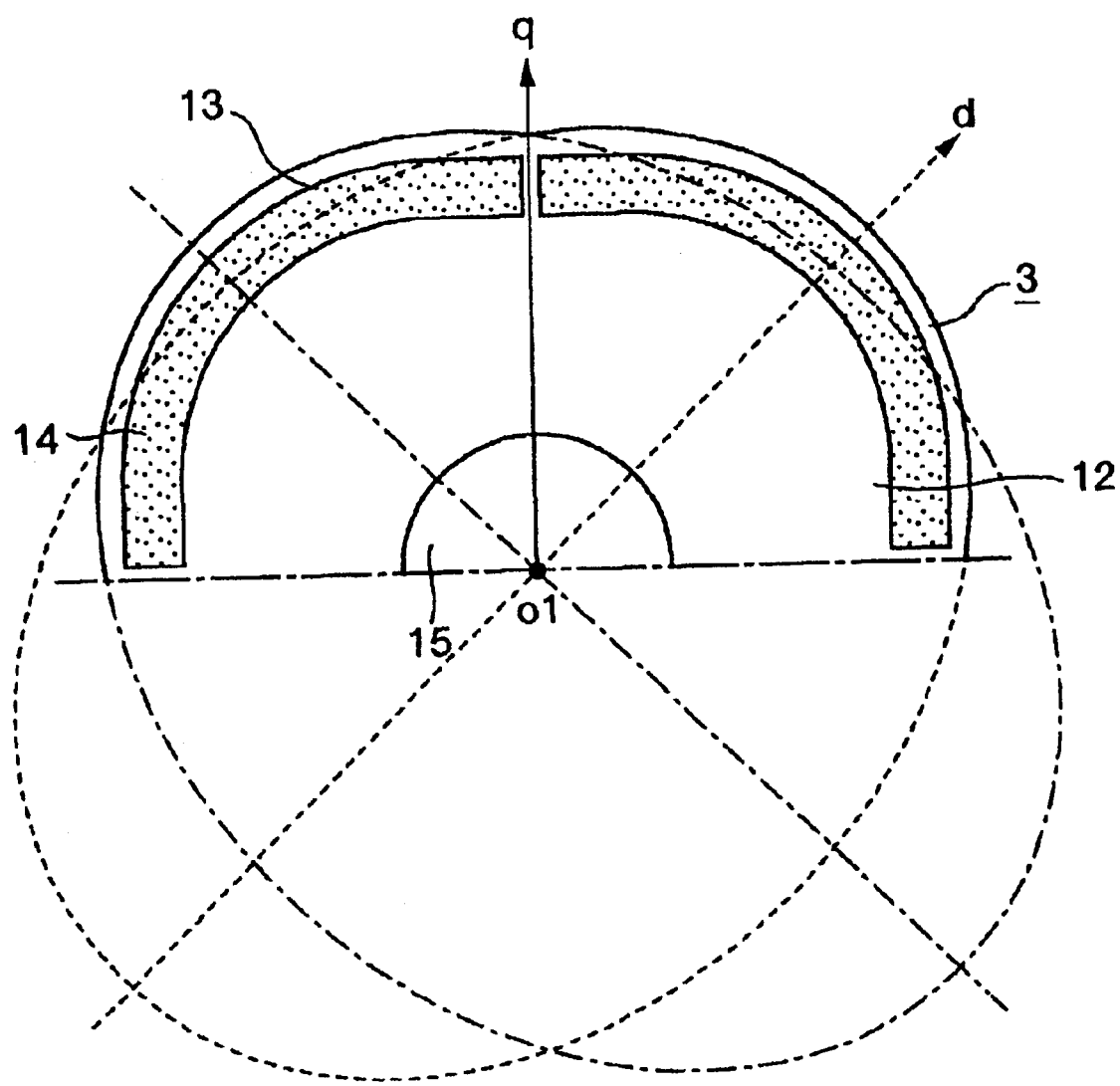
FIG. 6 is a sectional view of a peripheral shape of a rotor core of Embodiment 3 of a permanent magnetic type electric rotating machine according to the present invention.

FIG. 6 is a sectional view of a peripheral shape of a rotor of Embodiment 3 of a permanent magnetic type electric rotating machine according to the present invention.

For the rotor in the drawing, like reference numerals refer to like parts as shown in FIG. 3, and thus descriptions thereof will be omitted. FIG. 6 is different from FIG. 3 in that a peripheral shape of a rotor core 12 is a combination of arcs of ellipses having their long axes along d axes. In such a structure, a radial distance from a center of a rotor 3 to a periphery of the rotor 3 is still reduced gradually from the d axis to a q axis, and thus similar advantages to those of the embodiment shown in FIG. 3 can be obtained.

Embodiment 4

Figure 7:
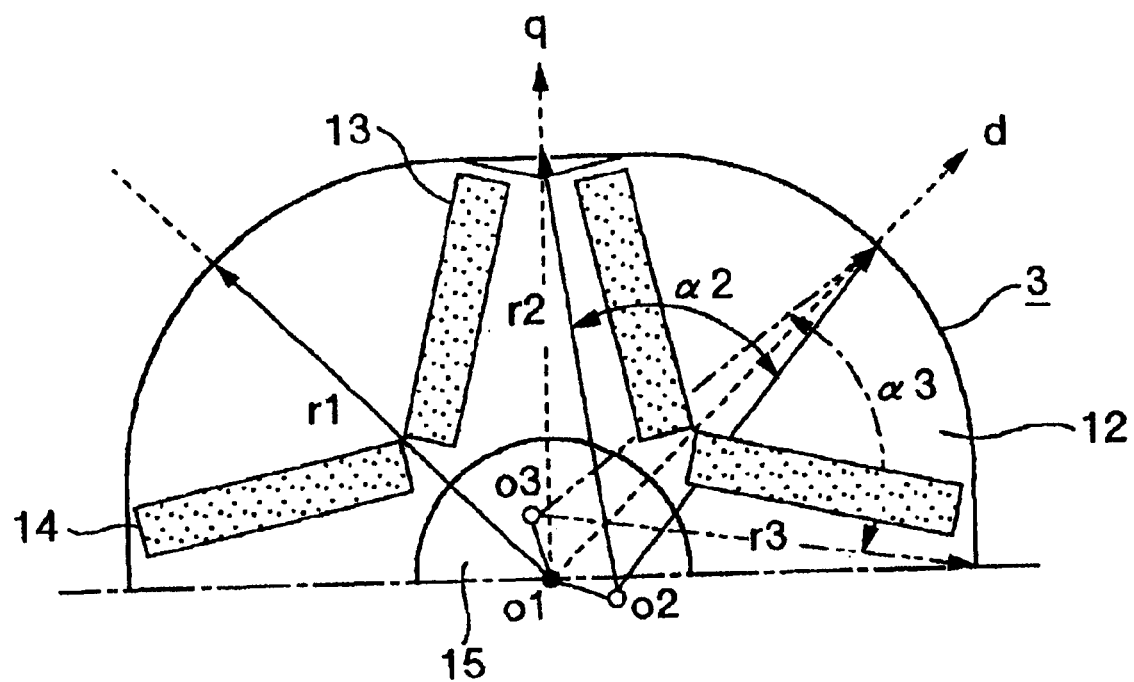
FIG. 7 is a sectional view of a peripheral shape of a rotor core of Embodiment 4 of a permanent magnetic type electric rotating machine according to the present invention.

FIG. 7 is a sectional view of a peripheral shape of a rotor of Embodiment 4 of a permanent magnetic type electric rotating machine according to the present invention.

For the rotor in the drawing, like reference numerals refer to like parts as shown in FIG. 3, and thus descriptions thereof will be omitted.

FIG. 7 is different from FIG. 3 in that permanent magnets 14 are placed in V shapes in a rotor core 12 and a periphery of the rotor core 12 is removed near a q axis.

For example, when the permanent magnets 14 are placed in V the shapes as shown, without removing the rotor core, magnetic fluxes of the permanent magnets 14 tend to diffract through the periphery of the rotor core 12 near the q axis to reduce magnetic fluxes interlinking armature winding 8. Therefore, the periphery of the rotor core 12 is removed (the rotor forms a recess toward the periphery) near the q axis to thereby prevent the magnetic fluxes of the permanent magnets 14 from shorting.

In such a case, similar advantages to those of Embodiment 1 can be obtained if the peripheral shape of the rotor core 12 is a combination of arcs around points O2 and O3 different from a center O1, and a radial distance from the center O1 to the periphery of the rotor core 12 is reduced gradually from a d axis to the q axis.

Embodiment 5

Figure 8:
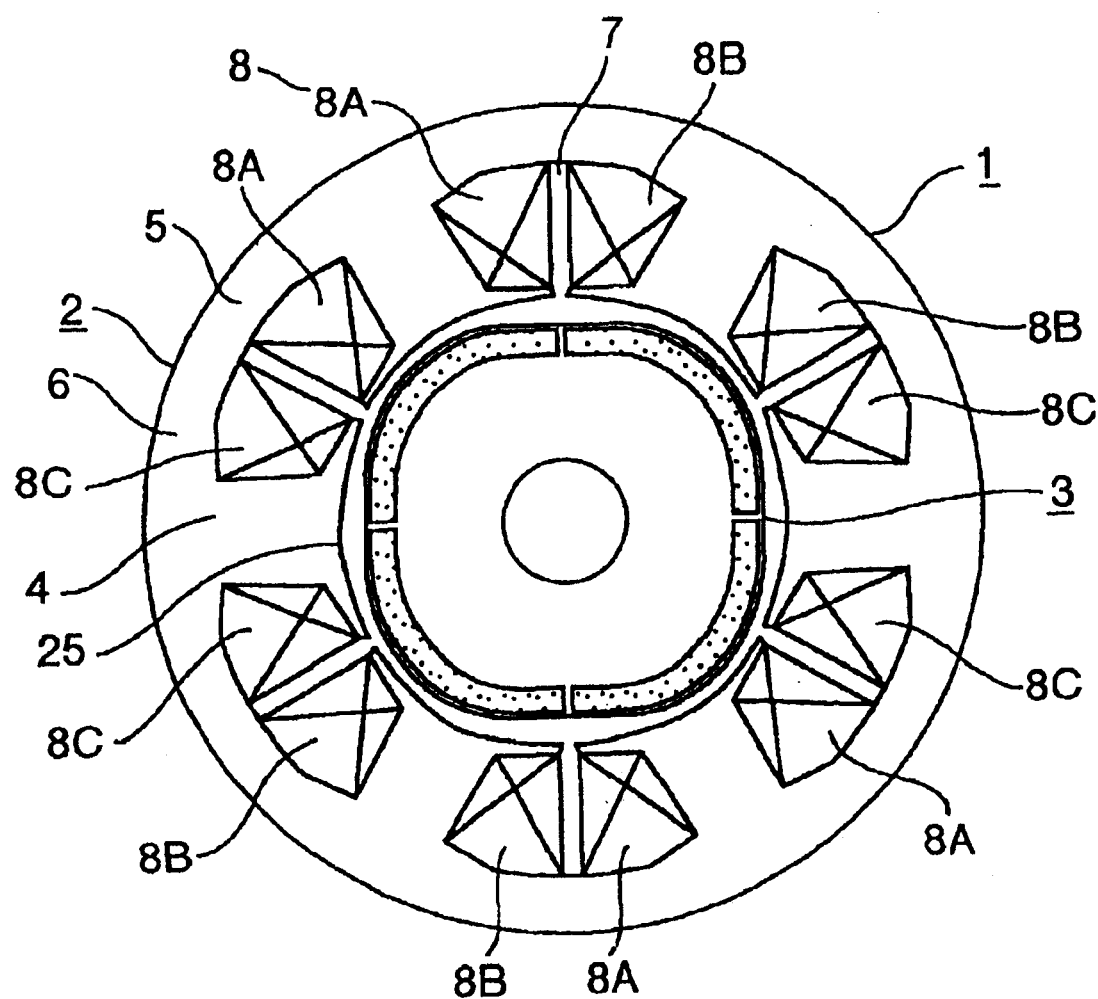
FIG. 8 is a sectional view of Embodiment 5 of a permanent magnetic type electric rotating machine according to the present invention.

FIG. 8 is a sectional view of Embodiment 5 of a permanent magnetic type electric rotating machine according to the invention.

For the permanent magnetic type electric rotating machine in the drawing, like reference numerals refer to like parts as shown in FIG. 1, and thus descriptions thereof will be omitted.

In FIG. 8, a structure of a rotor 3 is the same as in FIG. 1, but a structure of a stator 2 is different. Specifically, FIG. 8 is different from FIG. 1 in that centers of tips of stator teeth 25 form a circle concentric with a rotor core 12, and both ends of the tips of teeth 25 are formed in a straight line, that is, placed apart from the rotor 3.

In such a structure, the stator 2 is also formed to bring a waveform of an induced electromotive force close to a sine wave, so that the waveform of the induced electromotive force is brought closer to the sine wave than in the case of FIG. 1 to thereby reduce a harmonic component of an armature current and thus reduce a harmonic magnetic flux. Therefore, torque pulses are also reduced to thereby significantly reduce vibration and noise.

Embodiment 6

Figure 9:
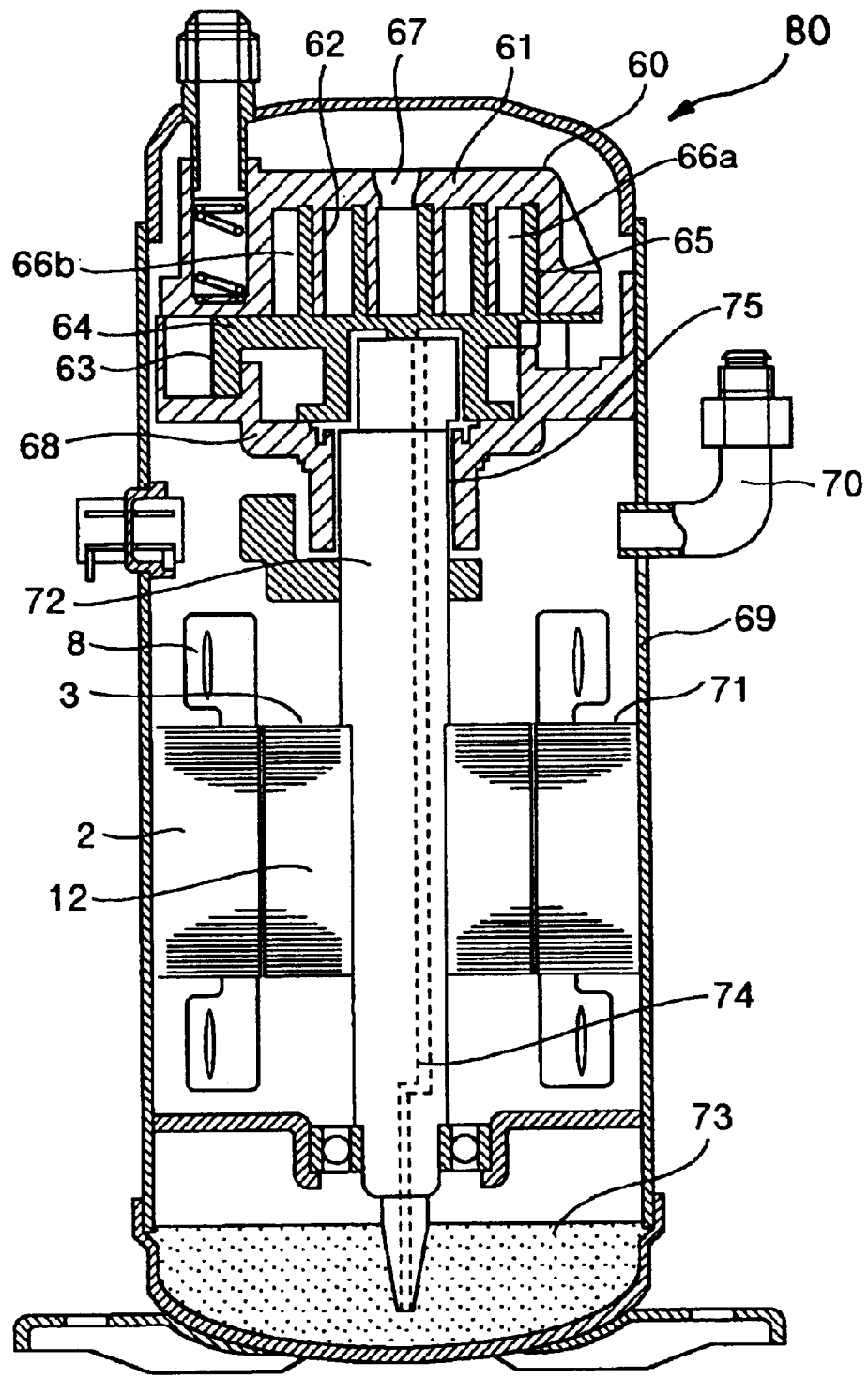
FIG. 9 shows a sectional structure of a compressor according to the present invention.

FIG. 9 is a sectional structure of a compressor 80 according to the present invention.

Figure 11A:
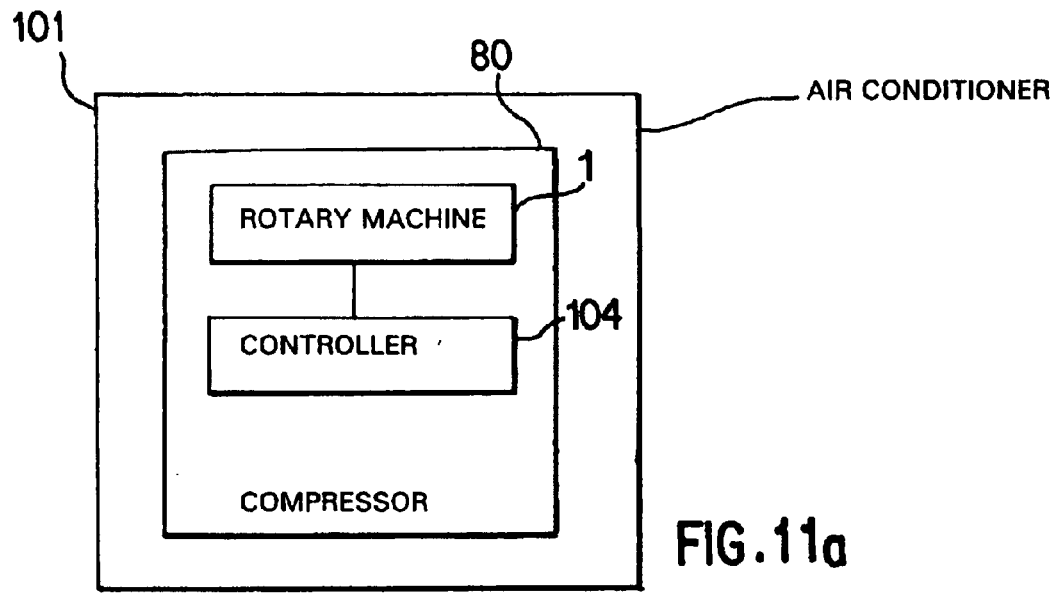
FIGS. 11a–11c show use of the compressor in different devices.
Figure 11B:
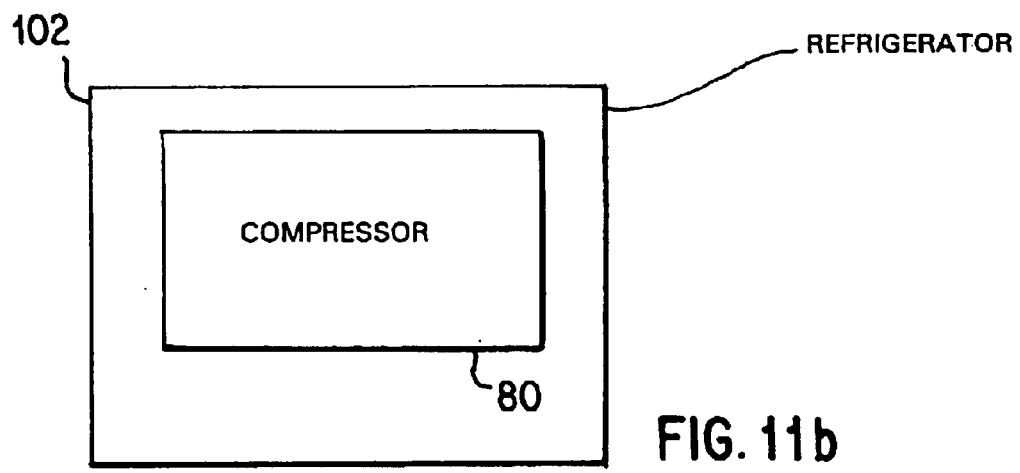
Figure 11C:
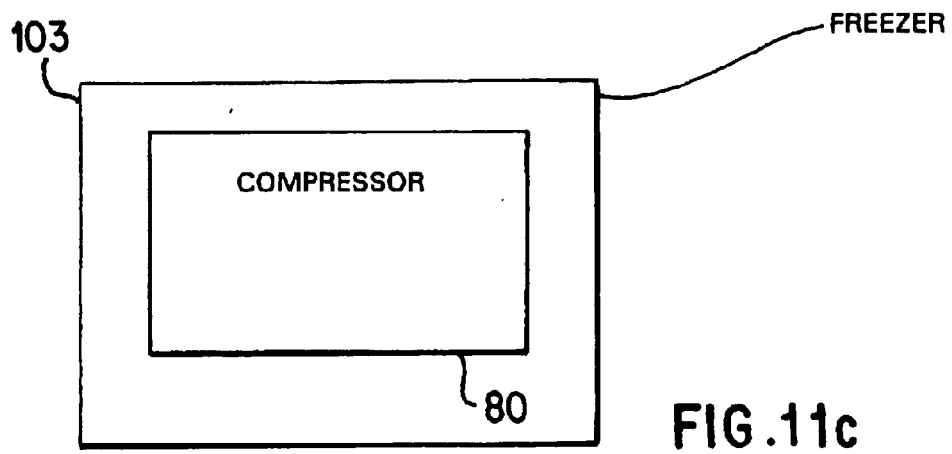

The compressor is formed by a spiral lap 62 standing straight on an end plate 61 of a fixed scrolling member 60 in mesh with a spiral lap 65 standing straight on an end plate 64 of a pivoting scrolling member 63, and the pivoting scrolling member 63 is pivoted by a crank shaft 72 to perform compression. Among compression chambers 66 (66a, 66b . . . ) formed by the fixed scrolling member 60 and pivoting scrolling member 63, an outermost compressor is moved toward a center of the scrolling members 60, 63 as the pivoting scrolling member 63 is pivoted, and its volume is gradually reduced. When the compression chambers 66a, 66b reach near the center of the scrolling members 60, 63, a compression gas in the compression chambers 66 are exhausted from an exhaust port 67 communicating with the compression chambers 66. The compression gas exhausted passes through a gas passage (not shown) provided in the fixed scrolling member 60 and a frame 68 to reach a compression container 69 below the frame 68, and exhausted from the compressor through an exhaust pipe 70 provided on a side wall of the compression container 69. In this compressor, the compression container 69 includes a driving motor 71, which is rotated at a rotational speed controlled by a separately placed inverter 109 (FIGS. 11a–11c) to perform compression. The driving motor 71 is a permanent magnetic type electric rotating machine including a stator 2 and a rotor 3.

In this way, when the permanent magnetic type electric rotating machine 1 is used as a driving motor for a compressor or the like, its operation is controlled by a controller (inverter). As described above, a waveform of an armature current depends on a waveform of a terminal voltage (voltage supplied from the controller) of the permanent magnetic type electric rotating machine 1 and a waveform of an induced electromotive force of the permanent magnetic type electric rotating machine 1. Thus, a harmonic component of an armature current can be reduced by bringing the waveform of the induced electromotive force close to a sine wave. The harmonic component of the armature current can be further reduced by operating the permanent magnetic type electric rotating machine 1 using a controller that outputs a voltage with a waveform of the sine wave. Therefore, combination of the permanent magnetic type electric rotating machine described in the present invention and the controller that outputs a voltage with a waveform of the sine wave allows significant reduction of vibration and noise.

Compressors are used as driving sources of air conditioners 101 (FIG. 11a), refrigerators 102 (FIG. 11b), or freezers 103 (FIG. 11c), and are operated throughout a year. Thus, the compressor is the most important product to be a target for energy saving in view of the problem of global warming. Using a permanent magnetic type electric rotating machine as a driving source allows saving energy by increased efficiency of the rotating machine, but it cannot be used without reducing its noise. On the other hand, when the permanent magnetic type electric rotating machine of the present invention is used as a driving source, it causes low noise and solves the environmental problem, thereby providing a compressor that has increased efficiency and achieves energy saving.

Using the compressor whose driving source is the permanent magnetic type electric rotating machine of the present invention in an air conditioner allows providing an air conditioner that meets the Top Runner standard.

Using the compressor whose driving force is the permanent magnetic type electric rotating machine of the present invention in a refrigerator allows providing an electric refrigerator that meets the Top Runner standard.

Using the compressor whose driving force is the permanent magnetic type electric rotating machine of the present invention in a freezer allows providing a freezer that meets the Top Runner standard.

The present invention provides a permanent magnetic type electric rotating machine that causes few problems of vibration and noise.

It will be further understood by those skilled in the art that the foregoing description has been made on embodiments of the invention and that various changes and modifications may be made in the invention without departing from the spirit of the invention and scope of the appended claims.

What is claimed is:

1. A compressor whose driving force is a permanent magnetic type electric rotating machine, said machine comprising:
    a stator having armature winding arranged in a plurality of slots formed in a stator core; and
    a rotor having permanent magnets held in a plurality of permanent magnetic insertion holes formed in a rotor core, wherein a peripheral surface of said rotor care is configured in such a manner that when an axis extending in a central direction of a magnetic pole of said rotor is a d axis, and an axis extending in a direction between magnetic poles that is offset from said central direction of the magnetic pole by 90 electrical degrees is a q axis, a radial distance from a center of said rotor core to a periphery of said rotor is reduced gradually from the d axis to the q axis.

2. A compressor whose driving force is a permanent magnetic type electric rotating machine, said machine comprising:

a stator having concentrated armature winding arranged to surround teeth in a plurality of slots formed in a stator core; and a rotor having permanent magnets held in a plurality of permanent magnetic insertion holes formed in a rotor core, wherein a peripheral surface of said rotor core is configured in such a manner that when an axis extending in a central direction of a magnetic pole of said rotor is a d axis, and an axis extending in a direction between magnetic poles that is offset from said central direction of the magnetic pole by 90 electrical degrees is a q axis, a radial distance from a center of the rotor core to a periphery of said rotor is reduced gradually from the d axis to the q axis.

3. A compressor whose driving force is a permanent magnetic type electric rotating machine as set forth in claim 1, wherein a peripheral shape of said rotor core for each magnetic pole is formed by at least two arcs.

4. A compressor whose driving force is a permanent magnetic type electric rotating machine as set forth in claim 1, wherein a peripheral shape of said rotor core is a combination of an arc concentric with a center of said rotor core and an arc not concentric with the center of said rotor core, and a portion near the d axis is formed by said arc concentric with the center of the rotor core.

5. A compressor whose driving force is a permanent magnetic type electric rotating machine as set forth in claim 1, wherein a peripheral shape of said rotor core is formed by an arc of an ellipse for each magnetic pole.

6. A compressor whose driving force is a permanent magnetic type electric rotating machine as set forth in claim 1, wherein a peripheral shape of said rotor core is formed to be a recess toward the periphery of said rotor core near the q axis.

7. A compressor whose driving force is a permanent magnetic type electric rotating machine as set forth in claim 1, wherein two or more kinds of gap surfaces having different gap length are formed on inner peripheral surfaces of teeth of said stator core, and a gap length at an end of a tip of each of said teeth is greater than a gap length at a center thereof.

8. A compressor whose driving force is a permanent magnetic type electric rotating machine as set forth in claim 1, wherein operation of said permanent magnetic type electric rotating machine is controlled by a motor controller that outputs a voltage with a waveform of a sine wave.

9. An air conditioner using a compressor as set forth in claim 1.

10. An air conditioner using a compressor as set forth in claim 2.

11. An air conditioner using a compressor as set forth in claim 3.

12. An air conditioner using a compressor as set forth in claim 4.

13. An air conditioner using a compressor as set forth in claim 5.

14. An air conditioner using a compressor as set forth in claim 6.

15. An air conditioner using a compressor as set forth in claim 7.

16. An air conditioner using a compressor as set forth in claim 8.

17. A refrigerator using a compressor as set forth in claim 1.

18. A refrigerator using a compressor as set forth in claim 2.

19. A refrigerator using a compressor as set forth in claim 3.

20. A refrigerator using a compressor as set forth in claim 4.

21. A refrigerator using a compressor as set forth in claim 5.

22. A refrigerator using a compressor as set forth in claim 6.

23. A refrigerator using a compressor as set forth in claim 7.

24. A refrigerator using a compressor as set forth in claim 8.

25. A freezer using a compressor as set forth in claim 1.
26. A freezer using a compressor as set forth in claim 2.
27. A freezer using a compressor as set forth in claim 3.
28. A freezer using a compressor as set forth in claim 4.
29. A freezer using a compressor as set forth in claim 5.
30. A freezer using a compressor as set forth in claim 6.
31. A freezer using a compressor as set forth in claim 7.
32. A freezer using a compressor as set forth in claim 8.

* * * * *